July 8, 1958   R. J. THORPE ET AL   2,841,957
AUTOMATIC COMPRESSOR PRESSURE LIMITER
Filed Aug. 9, 1955
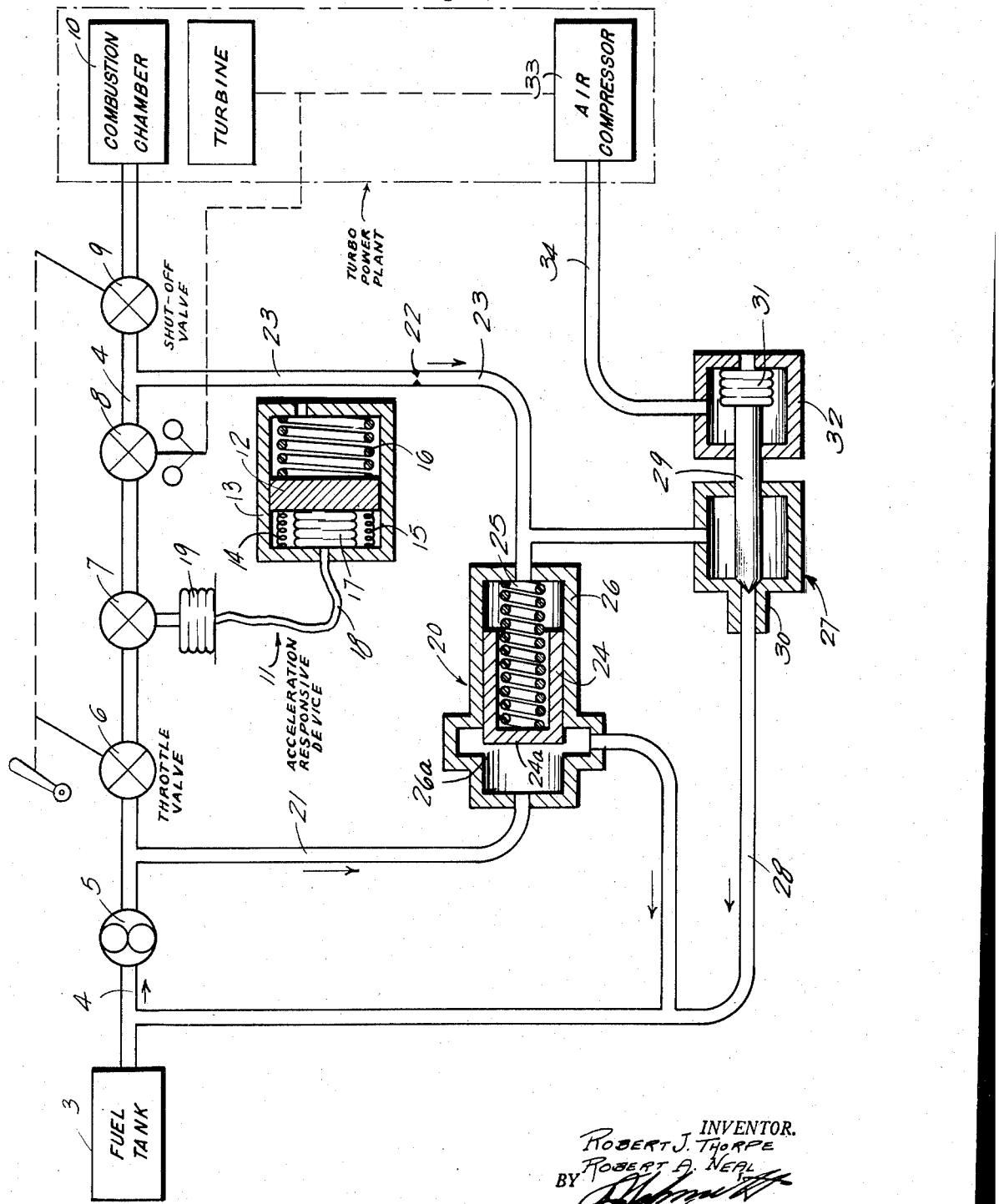
INVENTOR.
ROBERT J. THORPE
ROBERT A. NEAL
BY
ATTORNEYS

United States Patent Office 2,841,957
Patented July 8, 1958

2,841,957

AUTOMATIC COMPRESSOR PRESSURE LIMITER

Robert J. Thorpe and Robert A. Neal, Shawnee, Kans., assignors, by mesne assignments, to the United States of America as represented by the Secretary of the Navy Application August 9, 1955, Serial No. 527,430

1 Claim. (Cl. 60—39.28)

The present invention relates to turbo-jet engine and gas turbine apparatus and more particularly to a novel and improved fuel control system therefor.

In the various existing types of turbo-jet engines and gas turbine apparatus the rate and quantity of fuel delivered to the main and various auxiliary combustion chambers ultimately determine the instantaneous power and thrust that is developed. Physical strength characteristics of the various structural elements of the apparatus, however, as well as the apparatus as a whole require practical limits to be set upon the maximum values of developed power or thrust for safe operating conditions. In the past this has ordinarily been accomplished manually by the pilot or operator who observes a suitable gage or other indicating device that measures the output pressure of the air compressor of the apparatus and decreases the supply of fuel to the combustion chamber when the gage exceeds a predetermined maximum value. This, of course, requires the added attention of the pilot or operator during operating conditions.

It is a principal object of the present invention to provide a novel and improved fuel control system for turbo-jet and gas turbine apparatus.

It is a further object of the present invention to provide a novel and improved fuel control system for turbo-jet and gas turbine apparatus wherein the fuel flow to the various combustion chambers is automatically controlled and limited by a predetermined maximum value of air compressor output pressure.

Other objects and many of the attendant advantages of this invention will be readily appreciated as the same becomes better understood by reference to the following detailed description when considered in connection with the accompanying drawing wherein:

The drawing is a diagrammatic view of a preferred embodiment of the present invention.

In general the improved fuel system for the turbo-jet engine or gas turbine apparatus of the present invention includes a fuel source, means for pumping fuel from the fuel source to the combustion chamber of the engine, relief valve means for controlling the flow of fuel to the combustion chamber, and means responsive to a predetermined output pressure of the air compressor for causing the relief valve means to limit the flow of fuel to the combustion chamber. It has been found that the maximum power and thrust of the engine may be readily and effectively limited automatically in this way.

A preferred embodiment of the present invention is illustrated in the single figure of the drawing. As shown therein, fuel from the fuel tank or source 3 is directed through conduit 4 by the positive displacement fuel pump 5 successively through the manual throttle valve 6, the acceleration valve 7, the overspeed or governor valve 8, and the manual shut-off valve 9 to the combustion chamber 10 of the engine.

The manual throttle valve 6 and the manual shut-off valve 9 are preferably mechanically coupled to the throttle lever of the engine through any suitable conventional linkage system which for the sake of simplicity is shown diagrammatically in the drawing. Similarly since the specific structure of the governor valve 8 may take many different forms and since the details thereof form no part of the present invention, a full description of the same are omitted for the sake of simplicity.

The actuator mechanism 11 for the acceleration valve 7 preferably takes the form of a piston 12 which is normally centrally positioned within its cylinder 13 by the spring members or the like 14, 15, and 16. The bellows member 17 which is affixed to the piston 12 transmits changes of pressure which are proportional to the movement of the piston in the cylinder through the flexible conduit 18 to the bellows member 19 and as will be more apparent hereinafter motion of its movable extremity then limits and controls the flow of fuel through valve 7 during periods of acceleration and deceleration.

The differential relief valve or the like 20 is preferably positioned as shown in the conduit 21 which by-passes the fuel pump 5 and is controlled by fuel pressure behind orifice 22 which is disposed in the conduit 23 connected to conduit 4 between the governor 8 and the manual shut-off valve 9. The differential relief valve 20 preferably comprises the piston element or the like 24 which is normally biased by means of the spring member 25 towards its closed valve position in cylinder 26 and as will be more apparent hereinafter controls the flow of fuel around pump 5 and therefore the flow of fuel to the combustion chamber 10 in accordance with the differential of fuel pressure between the output side of fuel pump 5 and the combustion chamber.

The compressor output pressure regulating valve or the like 27 is preferably connected as shown in parallel with the differential relief valve by means of conduit 28. The needle-like valve element 29 which cooperates with a suitable complementary valve seat on the interior surface of the casing 30 governs and controls the flow of fluid through conduit 28. The interior of the bellows member or the like 31 which is attached on one side to the movable valve element 29 and which is affixed on its opposite side to the interior of the casing 32 is preferably vented to the atmosphere as shown whereas the interior of the casing 32 is connected to the output of the air compressor 33 through conduit 34.

In operation fuel is pumped through conduit 4 by fuel pump 5 successively through the throttle valve 6, the acceleration 7, the governor valve 8 and the shut-off valve 9 to the combustion chamber 10 of the engine. An abrupt acceleration of the aircraft will cause a displacement of the mass of the piston 12 in its cylinder 13 and a proportionate change of pressure within the bellows system causing valve 7 to temporarily reduce the flow of fuel therethrough. The governor mechanism 8 operates in a conventional manner and similarly limits the flow of fuel to the combustion chamber 10 when the speed of the aircraft becomes excessive.

The fuel which is bypassed about the fuel pump 5 through conduit 21 is controlled by the disposition of the piston 24 in the relief valve casing 26. Accordingly, as the area of the fluid path between the extremity 24a of piston 24 and the complimentary internal portion 26a of the casing 26 changes with changes in the pressure differential between the output of the fuel pump and the input to the combustion chamber, a proportionate greater or smaller amount of fuel is shunted about the pump 5.

When the output pressure of the air compressor exceeds a predetermined valve, deflation of the bellows member 31 will cause the needle valve 29 to open. When this occurs, fuel from the input to the combustion chamber 10 will flow through conduit 28 back to the input side of pump 5. This will cause the pressure in conduit 23 to decrease, and the valve 20 to move toward a more open position, thereby allowing more fuel to pass around pump 5 and less fuel to be delivered to the combustion chamber 10. The reduced amount of fuel delivered to the combustion chamber then reduces the development of power and thrust by the engine and an automatic limitation upon a further increase in power is effected until the output pressure of the air compressor no longer exceeds a preselected maximum value.

It might be noted that orifice 22 is preferably provided to limit the bleeding of fuel away from the combustion chamber when valve 27 opens.

Obviously many modifications and variations of the present invention are possible in the light of the above teachings. It is therefore to be understood that within the scope of the appended claim the invention may be practiced otherwise than as specifically described.

What is claimed is:

In a fuel regulating system a turbo-power plant including an air compressor and a combustion chamber; a fuel tank; a fuel pump; a manual throttle valve; a valve sensitive to acceleration of the turbo-power plant; a valve sensitive to the speed of the turbo-power plant; a first fuel conduit successively interconnecting the fuel tank, the fuel pump, the throttle valve, the acceleration valve, the governor valve and the combustion chamber; a second fuel conduit in parallel with the fuel pump; a relief valve disposed in said second fuel conduit regulating fuel flow therethrough; means responsive to the pressure differential between the output of the pump and the input to the combustion chamber for controlling disposition of the relief valve; a third fuel conduit which extends from a portion of said first fuel conduit between the governor valve and the combustion chamber to a portion of said first fuel conduit between the fuel tank and the fuel pump; a needle valve disposed in said third fuel conduit regulating fuel flow therethrough; and means responsive to the output pressure of the air compressor for controlling disposition of the needle valve.

References Cited in the file of this patent
UNITED STATES PATENTS

| | | |
|---|---|---|
| 2,538,606 | Udale | Jan. 16, 1951 |
| 2,688,841 | Decher et al. | Sept. 14, 1954 |
| 2,694,290 | Best | Nov. 16, 1954 |
| 2,695,498 | Szydlowski | Nov. 30, 1954 |

FOREIGN PATENTS

| | | |
|---|---|---|
| 646,780 | Great Britain | Nov. 29, 1950 |